United States Patent [19]

Figiel et al.

[11] Patent Number: 4,724,096

[45] Date of Patent: * Feb. 9, 1988

[54] SURFACTANT CONTAINING BINARY, WATER DISPLACEMENT COMPOSITION

[75] Inventors: Francis J. Figiel, Boonton, N.J.; Gary J. Zyhowski, Hamburg, N.Y.

[73] Assignee: Allied Corporation, Morris Township, Morris County, N.J.

[*] Notice: The portion of the term of this patent subsequent to Aug. 25, 2004 has been disclaimed.

[21] Appl. No.: 856,892

[22] Filed: Apr. 28, 1986

[51] Int. Cl.$^4$ .................. C09K 3/00; C23G 5/032
[52] U.S. Cl. .................... 252/194; 252/171; 252/364; 252/DIG. 9
[58] Field of Search .......... 252/171, 194, 364, DIG. 9

[56] References Cited

U.S. PATENT DOCUMENTS

| | | |
|---|---|---|
| 3,336,232 | 8/1967 | Bauer et al. |
| 3,340,199 | 9/1967 | Clay et al. |
| 3,386,181 | 6/1968 | Steinacker |
| 3,539,462 | 11/1970 | Schofield ............... 252/170 |
| 3,559,297 | 2/1971 | Figiel |
| 3,710,450 | 1/1973 | Figiel |
| 3,846,327 | 11/1974 | Schofield ............ 252/DIG. 9 |
| 4,401,584 | 8/1983 | Tajkowski et al. |
| 4,438,026 | 3/1984 | Tajkowski |
| 4,491,531 | 1/1985 | Bargigia et al. ........... 252/194 X |
| 4,606,844 | 8/1986 | Aguiléra et al. ........... 252/194 |

FOREIGN PATENT DOCUMENTS

| | | | |
|---|---|---|---|
| 872752 | 6/1971 | Canada ............ 252/171 |
| 2325404 | 5/1977 | France ............ 252/194 |
| 517835 | 2/1972 | Switzerland ........ 252/194 |
| 1307274 | 2/1973 | United Kingdom . | |

OTHER PUBLICATIONS

"Cool-Dry TM", Product Information Article by Metal Coatings International, 1985.
"GAFAC Surfactants", GAF Corp. Technical Bulletin, 7543-096, N.Y., N.Y., (1967).

*Primary Examiner*—Matthew A. Thexton
*Attorney, Agent, or Firm*—Jay P. Friedenson

[57] ABSTRACT

Improved article drying compositions which effectively remove water from the surface of non-absorbent articles to be dried, are provided. The solvents used to formulate the additive modified compositions are azeotropic binary mixtures, comprised of isobutanol and trichlorotrifluoroethane; and n-butanol and trichlorotrifluoroethane. The non-volatile additive, dissolved in the binary systems comprises a phosphate ester free acid type. These additives characterized as complex phosphate ester-free acid surfactants of the ethylene oxide type, which are commercially available, are preferred.

6 Claims, No Drawings

SURFACTANT CONTAINING BINARY, WATER DISPLACEMENT COMPOSITION

The invention relates to water removal composition. More particularly, the invention relates to improved compositions for drying water wet articles in which the residue left on the dried article using the water removal composition is substantially reduced.

The wettability is enhanced through the presence of iso-butanol or n-butanol as one of the components of the azeotropic mixtures used in these formulations.

BACKGROUND OF THE INVENTION

Various drying compositions are known in the prior art. These compositions contain various kinds and various amounts of surfactants and other additives. Specifically, the concentration of surfactants added to chlorocarbon and chlorofluorocarbon solvents, such as, methylene chloride or 1,1,2-trichloro-1,2,2-trifluoroethane typically used in amounts of 500 ppm or greater, such as in U.S. Pat. Nos. 3,386,181; 4,401,584 and 4,438,026 are known. Such levels of surfactant leave substantial residue on dried parts from the drying solvent and require relatively long rinse times. Moreover, the inclusion in the drying composition of such relatively large amounts of surfactants hinders phase separation in that water becomes more miscible and hence more difficult to remove. It is thus apparent that a need exists for an improved drying composition characterised as an azeotrope which can function at a low additive level and maintain higher solvency power and enhanced wettability.

SUMMARY OF THE INVENTION

It is a primary object of the invention to provide a water removal composition that functions at a low additive level and enhanced wettability. It is a more particular object of the invention to provide an azeotropic drying composition of 1,1,2-trichloro-1,2,2-trifluoroethane and n-butanol or isobutanol which leaves minimal residue on articles dried with these compositions and which because of the low solubility of water therein permits a more complete phase separation.

The presence of n-butanol or isobutanol in the base solvent contributes to water removal by improving solvent wettability in a manner similar to a surfactant, but without increasing non-volatile residue; hence not contributing to rinse sump contamination or process time. This is an advantage over the prior art. The azeotropic nature of the volatile components of the composition of the invention provides increased wettability to both liquid and vapor, hence constituting an advantage over prior art surfactant/solvent systems.

DETAILED DESCRIPTION OF THE INVENTION

In accordance with the invention, any water immiscible organic solvent may be employed. Such solvent should have a boiling point of 21°–75° C., a density of at least 1.1 at 20° C., and should not form an azeotrope containing more than 2% by weight water. "Water-immiscible solvent" is intended to include solvents in which water is not more than 0.1% by weight soluble. Preferably, the solvent has a boiling point of about 35°–49° C., a density of about 1.4 to 1.6 weight percent at 20° C., and does not form an azeotrope containing more than about 0.5% of water. Suitable solvents include trichloromonofluoromethane, 1,1,2-trichloro-1,2,2-trifluoroethane and azeotropic mixtures of the latter solvent with n-butanol or isobutanol. The isobutanoltrichlorotrifluoroethane mixture is preferred.

The solvent generally contains a surfactant to aid in displacement of water from articles to be dried. Preferably, the surfactant is soluble in the solvent and virtually insoluble in water. Any solvent-soluble surfactant which provides for displacement of water by the solvent may be used. Suitable surfactants include long chain carboxylic acids containing an amidomethyl group such as a oleoyl sarcosine or alkyl phosphate esters neutralized with saturated aliphatic amines such as the 2-ethyhexyl amine salt of di-n-octyl phosphate or an ethylene oxide-adduct type complex phosphate ester free acid. The latter is preferred. Such phosphate ester free acid surfactants are commercially available and contain a mixture of both mono and di-esters. The hydrophobic base may be aromatic or aliphatic, preferably aromatic.

Typical of the complex phosphate ester-free acid surfactants are those of the ethylene oxide adduct type. These anionic products are mixtures of mono and diesters, e.g.

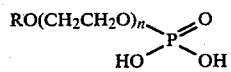

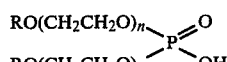

wherein R is an alkylaryl radical and introduces a hydrophobic property; n has a value that signifies 2–10 moles of ethylene oxide reacted with one mole of hydrophobe. Preferably 3–5 moles of ethylene oxide are reacted with one mole of hydrophobe.

The hydrophobe or hydrophobic group R is comprised of an alkyl group of three to nine carbon atoms, attached to aromatic nuclei such as benzene or naphthalene. The preferable hydrophobe is an aromatic alkyl phenol preferably nonyl phenol. The preferred surfactants of this type are thus mixtures of the free-acids of mono- and di-phosphate esters having polyethylene oxide adducts having a hydrophobic terminal group.

Such surfactants include GAFAC RM-410 or GAFAC RL-210 (GAF Corp.); GAFAC RM-410 is preferred.

Surfactant concentration may range from 150 ppm to 500 ppm, but a concentration between 50 and 500 ppm is preferred. It is further preferred that surfactant concentration be 100 ppm.

The presence of certain alcohols (n-butanol or isobutanol) improves the wettability of the solvent and hence aids in the removal of water without contribution to non-volatile residue in the solvent. It is also preferred that the alcohol form a constant-boiling composition with the solvent.

The constant-boiling composition should contain between 0.1 and 3.0% by weight of alcohol and preferably between 0.1 and 1.0% by weight of alcohol. The constant-boiling behavior is desired to maintain wettability characteristics in both liquid and vapor phases of the solvent composition during use (and to avoid build-up of alcohol in the boiling sump of a typical solvent dryer). It is further preferred that the alcohol be n-butanol at a composition between 0.5 and 0.75% by weight or isobutanol at a composition between 0.2 and 0.5% by weight.

In order that the invention may be more fully understood, the following examples are set forth for purposes of illustration. The specific enumeration of details therein should not be interpreted as a limitation except as expressed in the amended claims.

EXAMPLE 1

Constant boiling behavior of 1,1,2-trichloro-1,2,2-trifluoroethane and n-butanol, isobutanol.

In order to maintain the contribution of wettability provided by a volatile additive such as an alcohol, throughout the liquid and vapor zones of a typical drying apparatus, the volatile additive and base solvent must form a constant boiling mixture. Thus, 1350 grams of a mixture of 3.0% by weight n-butanol in 1,1,2-trichloro-1,2,2-trifluoroethane was charged to a 3 liter boiling flask fitted with a 21" Vigreaux column and Allihn reflux head. The mixture was allowed to reflux for one hour before distilling over any material. The boil-up rate was 15 ml/minute. The first overhead cut, 170 ml in volume, was discarded. A 30 minute period of total reflux was provided between cuts. The next three cuts were combined and retained to serve as starting material for a second distillation. Cut size, head temperatures, and barometric pressure are given in Table 1.

TABLE 1

First Distillation of n-butanol and
1,1,2-trichloro-1,2,2-trifluoroethane

| Cut # | Cut Weight, grams | Head Temperature °C. |
|---|---|---|
| 2 | 262.3 | 47.5 |
| 3 | 267.3 | 47.5 |
| 4 | 285.8 | 47.5 |

Barometric Pressure = 743.0 mm Hg at 28.1° C.

The bottom portion was discarded. The recombined cuts 2, 3 and 4 were charged to the same apparatus as above and a second distillation performed in the same manner. Analysis of the distilled cuts was performed by gas chromatography. Results appear in Table 2.

TABLE 2

Analysis of Distillation Cuts, Second Distillation of
n-butanol and 1,1,2-trichloro-1,2,2-trifluoroethane

| Cut # | Grams Weight, grams | Head Temperature % | Cut Composition, % wt. n-butanol |
|---|---|---|---|
| 2 | 154.4 | 48.0 | 0.33 |
| 3 | 153.5 | 48.0 | 0.38 |
| 4 | 152.5 | 48.0 | 0.45 |

Barometric Pressure = 753.5 mm Hg @ 24.0° C.

A third distillation was performed where 176.2 grams of a mixture containing 0.3% weight n-butanol served as starting material. This composition was formulated as the average of the cuts from the second distillation. Table 3 gives the composition of the cuts that resulted.

TABLE 3

| Cut # | Cut Weight grams | Head Temperature °C. | Cut Composition, % wt. n-butanol |
|---|---|---|---|
| 2 | 152.4 | 48.0 | 0.22 |
| 3 | 153.3 | 48.0 | 0.23 |
| 4 | 153.0 | 48.0 | 0.28 |

Barometric Pressure = 749.2 mm Hg @ 26.5° C.

Tables 2 and 3 of this example illustrate the constant boiling behavior of n-butanol in 1,1,2-trichloro-1,2,2-trifluoroethane through successive distillation at a n-butanol concentration of about 0.2 to 0.5% by weight.

Similarly, isobutanol and 1,1,2-trichloro-1,2,2-trifluoroethane were distilled. Data in Tables 4, 5 and 6 establish the constant boiling behavior of this pair.

TABLE 4

First Distillation of isobutanol and
1,1,2-trichloro-1,2,2,-trifluoroethane mixture,
Charge Composition - 3% weight isobutanol in
1,1,2-trichloro-1,2,2-trifluoroethane Charge Weight = 1632 grams

| Cut # | Cut Weight, grams | Head Temperature °C. |
|---|---|---|
| 2 | 342.1 | 47.5 |
| 3 | 350.6 | 47.5 |
| 4 | 345.6 | 47.5 |

TABLE 5

Analysis of Cuts, Second Distillation of Isobutanol
and 1,1,2-trichloro-1,2,2-trifluoroethane mixture
Charge Weight - 1028.9 grams

| Cut # | Cut Weight, grams | Head Temperature °C. | Cut Composition, % wt. isobutanol |
|---|---|---|---|
| 2 | 170.8 | 47.9 | 0.58 |
| 3 | 175.0 | 47.9 | 0.63 |
| 4 | 228.0 | 47.8 | 0.74 |

Barometric Pressure = 750.54 mm Hg @ 26.1° C.

TABLE 6

Final Distillation of Isobutanol in
1,1,2-trichloro-1,2,2-trifluoroethane
Charge composition: 0.65 weight percent isobutanol in
1,1,2-trichloro-1,2,2-trifluoroethane
Charge Weight = 1028.9 grams

| Cut # | Cut Weight, grams | Head Temperature °C. | Cut Composition, % wt. n-butanol |
|---|---|---|---|
| 2 | 156.6 | 47.0 | 0.51 |
| 3 | 157.0 | 47.0 | 0.54 |
| 4 | 154.6 | 47.0 | 0.60 |

Barometric Pressure - 749.2 mm Hg @ 26.5° C.

It can be seen from date in Tables 4, 5 and 6 that isobutanol forms a constant-boiling composition with 1,1,2-trichloro-1,2,2-trifluoroethane at about 0.5 to 0.75% by weight of isobutanol.

EXAMPLE II

The ability of a solvent to preferentially wet a substrate that is already wet with water was characterized using the method below. A deionized water droplet of measured volume was expressed from a 10 microliter syringe with the resulting droplet adhered to the end of the needle. The needle was immersed just beneath the surface of given solvent composition and held in a beaker at 99° F. Immediate removal of the needle followed. The process required a smooth motion of one second duration. The droplet volume that would release to the solvent composition surface was recorded. It is apparent in Table 7 of the example, that the addition of certain alcohols to 1,1,2-trichloro-1,2,2-trifluoroethane increases the ability of the solvent to wet a substrate already wet with water.

TABLE 7

Enhanced Wettability of
1,1,2-trichloro-1,2,2-trifluoroethane
Using Certain Alcohols

| Solvent Composition % Weight | Water Droplet Volume Released, ml. |
|---|---|
| (1) 1,1,2-trichloro- | 0.20 |

TABLE 7-continued

Enhanced Wettability of
1,1,2-trichloro-1,2,2-trifluoroethane
Using Certain Alcohols

| Solvent Composition % Weight | Water Droplet Volume Released, ml. |
|---|---|
| 1,2,2-trifluoroethane (Solv. A) | |
| (2) 0.54% isobutanol in Solv. A | 0.05 |
| (3) 0.22% n-butanol in Solv. A | 0.10 |
| (4) 0.5% isopropanol in Solv. A | 0.10 |

EXAMPLE III

Water Removal Effectiveness

The method used to determine water displacement times given in Table 7 is described below. Clean stainless steel screws, 1"×¼", roundhead, were used as received. Alumina ceramic slides, 1½"×1½", were found to be 100% water wettable as acquired, hence were not cleaned prior to use. To ensure a 100% water wettable surface on 1"×3" glass slide, said slides were soaked overnight in a mixture of water, ammonia, methanol, and detergent. The slides were then rinsed consecutively, with deionized water, acetone, and methanol and finally allowed to air dry.

A 600 ml glass beaker was charged with 400 ml of drying solvent and heated to boiling on a ceramic hot plate. Parts to be dried were first immersed in deionized water and then in boiling drying solvent. The time required to remove water from the part was recorded. In Table 8, four additive packages were evaluated for their ability to impart water displacement capabilities to base solvent, in this case, 1,1,2-trichloro-1,2,2-trifluoroethane. In the case of the latter two additive packages, each when combined with 1,1,2-trichloro-1,2,2-trifluoroethane constitute commercially available water displacement solvents as noted in Table 8 under solvent compositions. The commercial materials were used in this evaluation. Table 8 of this example shows that water displacement from glass, alumina, ceramic and stainless steel is demonstrated for the composition of the invention in time frames comparable to existing commercial formulations.

TABLE 8

Effectiveness of Water Removal
Time Required to Remove Water, Seconds

| Solvent Composition 1,1,2-trichloro-1,2,2-trifluoroethane with... | Stainless Steel Screws | | Alumina Ceramic | |
|---|---|---|---|---|
| | Trial 1 | Trial 2 | Trial 1 | Trial 2 |
| 100 ppm phosphate ester free acid surfactant (2) and 0.54% isobutanol | 3 | 2 | 9 | 10 |
| 100 ppm phosphate ester free acid surfactant (2) and 0.22% n-butanol | 5 | 5 | 15 | 15 |
| alkyl phosphate ester neutralized with saturated aliphatic amine (3) (Commercially available as Du Pont Freon ® TDFC) | 2 | 2 | 10 | 10 |
| 0.25% sarcosine (4) surfactant and demulsifiers (Available commercially as GENESOLV ® DRM from Allied-Signal Corp.) | 5 | 5 | 105 (1) | 195 (1) |

TABLE 8-continued

Effectiveness of Water Removal
Time Required to Remove Water, Seconds

| Solvent Composition 1,1,2-trichloro-1,2,2-trifluoroethane with | Glass Slides | | |
|---|---|---|---|
| | Trial 1 | Trial 2 | Trial 3 |
| 100 ppm phosphate ester free acid surfactant (2) and 0.54% isobutanol | 20 | 25 | 26 |
| 100 ppm phosphate ester free acid surfactant (2) and 0.22% n-butanol | 26 | 20 | 21 |
| alkyl phosphate ester neutralized with saturated aliphatic amine (3) (Commercially as Du Pont Freon ® TDFC) | 5 | 10 | 5 |
| 0.25% sarcosine (4) surfactant and demulsifiers (Commercially as Allied GENESOLV ® DRM) | 85 | 195 | 240 (1) |

(1) No drying detected, the test was interrupted at this point.
(2) GAFAC RM-410 surfactant (GAF Corporation).
(3) 0.05 to 3.0% by weight of a mixture of mono-oxo-octyl and di-oxo-octyl phosphates or a mixture of mono(tridecyl) and bis(tridecyl) phosphates or a mixture of mono- and di-n-octyl and mono- and di-n-decyl phosphates neutralized with 2-ethylhexylamine or other suitable amines as disclosed in U.S. Pat. No. 3,386,181.
(4) N—lauryl sarcosine. However, N—cocoyl sarcosine or N—oleoyl sarcosine, and mixtures, may also be used as disclosed in U.S. Pat. No. 4,401,584.

EXAMPLE IV

Solubility of Water in Water Removal Compositions

Increased solubility of water in water removal solvents affects drying and dryer performance by prohibiting complete phase separation of water from solvents, increasing the tendency to form emulsions and necessarily allowing more water to inhabit the vapor zone of a dryer. Table 9 of this example illustrates the solubility of water in various drying solvent compositions. In Table 9 of this example, as in Table 8 of Example III, the combination of 1,1,2-trichloro-1,2,2-trifluoroethane with each of the four listed additive packages were tested for water displacement ability. In the case of the latter two additive packages, their combination with 1,1,2-trichloro-1,2,2-trifluoroethane produces a result comprable to commercially available water displacement solvents. These two commercial solvents, as given in Table 9 under Solvent Composition, were used as such in testing. A microburet was used to titrate deionized water into 50 ml of drying solvent at room temperature. The buret tip was held beneath the solvent surface. The solvent was stirred using a magnetic stirrer. The volume of water added that caused cloudiness was taken to be the limit of solubility.

TABLE 9

Solubility of Water Removal Compositions

| Solvent Composition | Volume of Deionized Water Required to Generate Cloudiness, ml. |
|---|---|
| 1,1,2-trichloro-1,2,2-trifluoroethane with | |

TABLE 9-continued

| Solvent Composition | Volume of Deionized Water Required to Generate Cloudiness, ml. |
|---|---|
| 100 ppm phosphate ester free acid surfactant (1) and 0.54% isobutanol | 0.4 |
| 100 ppm phosphate ester free acid surfactant (1) and 0.22% n-butanol | 0.4 |
| alkyl phosphate ester, amine salt (2) (Du Pont Freon ® TDFC) | 0.5 |
| 0.25% Sarcosine surfactants (3) (Allied GENESOLV ® DRM) | 1.2 |

(1) GAFAC RM-410 surfactant (GAF Corp.)
(2) 0.05 to 3.0% by weight of a mixture of mono-oxo-octyl and di-oxo-octyl phosphates or a mixture of mono(tridecyl) and bis(tridecyl) phosphates or a mixture of mono- and di-n-octyl and di-n-decyl phosphates neutralized with 2-ethylhexylamine or other suitable amine as disclosed in U.S. Pat. No. 3,386,181
(3) N—lauryl sarcosine. However, N—cocoyl or N—oleoyl sarcosine and mixtures may also be used as disclosed in U.S. Pat. No. 4,401,584.

Various changes may be made in the reactants, proportions, and conditions within the disclosure is set forth and therefore the invention is not to be limited except as set forth in the claims which follow.

What is claimed is:

1. A composition fo removal of water from the surface of articles comprising: a binary azeotropic composition comprising:

(a) 1,1,2-trichloro-1,2,2-trifluoroethane;
(b) from about 0.1 to about 3 percent by weight, based on the weight of (a) of an alcohol selected from n-butanol or isobutanol; and from about 50 ppm to about 500 ppm of a mixture of the free-acids of mono- and di-phosphate esters having polyethylene oxide adducts having a hydrophobic terminal group.

2. The composition of claim 1 wherein the binary azeotropic mixture is n-butanol and 1,1,2-trichloro-1,2,2-trifluoroethane comprised of 0.20–0.50 weight percent of n-butanol and 99.80–99.50 1,1,2-trichloro-1,2,2-trifluoroethane and has a boiling point of about 48.0° F. at the atmospheric pressure of about 749.2 mm Hg.

3. The composition of claim 1 wherein the binary azeotropic mixture is isobutanol and 1,1,2-trichloro-1,2,2-trifluoroethane comprised of 99.50–99.25 weight percent of 1,1,2-trichloro-1,2,2-trifluoroethane and 0.50–0.75 weight percent of isobutanol and has a boiling point of about 47.5° C. at the atmospheric pressure of about 749.2 mm Hg.

4. The composition of claim 1 wherein the hydrophobic group is an alkyl group 3 to 9 carbon atoms attached to an aromatic nucleus.

5. The composition of claim 4 wherein the hydrophobic group is derived from an aromatic alkyl phenol.

6. The composition of claim 4 wherein the hydrophobic group is derived from nonyl phenol.

* * * * *

UNITED STATES PATENT AND TRADEMARK OFFICE
CERTIFICATE OF CORRECTION

PATENT NO. : 4,724,096
DATED : February 9, 1988
INVENTOR(S) : Figiel et al.

It is certified that error appears in the above-identified patent and that said Letters Patent are hereby corrected as shown below:

In the Specification

Column 3, line 68
   delete "1,2,2- "; substitute therefor -- 1,2,2- --.

Column 4, line 1
   delete "-trifluoroethane"; substitute therefor -- trifluoroethane --.

Column 4, line 3
   delete "1,2,2--"; substitute therefor -- 1,2,2- --.

Column 3, line 4
   delete "-trifluoroethane"; substitute therefor -- trifluoroethane --.

Claim 1, line 1, delete "fo"; substitute therefor --for--

Claim 4, line 2, after "group" insert --of--

Signed and Sealed this

Second Day of August, 1988

Attest:

DONALD J. QUIGG

Attesting Officer   Commissioner of Patents and Trademarks